(12) United States Patent
Kaabouch et al.

(10) Patent No.: US 11,500,109 B2
(45) Date of Patent: Nov. 15, 2022

(54) DETECTION OF SPOOFING AND MEACONING FOR GEOLOCATION POSITIONING SYSTEM SIGNALS

(71) Applicants: Raytheon Company, Waltham, MA (US); University of North Dakota, Grand Forks, ND (US)

(72) Inventors: Naima Kaabouch, Grand Forks, ND (US); Mohsen Riahi Manesh, Grand Forks, ND (US); Jonathan R. Kenney, McKinney, TX (US)

(73) Assignees: Raytheon Company, Waltham, MA (US); University of North Dakota, Grand Forks, ND (US)

( * ) Notice: Subject to any disclaimer, the term of this patent is extended or adjusted under 35 U.S.C. 154(b) by 902 days.

(21) Appl. No.: 16/367,961

(22) Filed: Mar. 28, 2019

(65) Prior Publication Data

US 2020/0225358 A1 Jul. 16, 2020

Related U.S. Application Data

(60) Provisional application No. 62/790,575, filed on Jan. 10, 2019.

(51) Int. Cl.
*G01S 19/21* (2010.01)
*G01S 19/29* (2010.01)
(Continued)

(52) U.S. Cl.
CPC ............ *G01S 19/215* (2013.01); *G01S 19/29* (2013.01); *G06N 3/08* (2013.01); *G06N 7/005* (2013.01); *G06N 20/00* (2019.01)

(58) Field of Classification Search
CPC .................................................. G01S 19/215
(Continued)

(56) References Cited

U.S. PATENT DOCUMENTS

| 7,952,519 B1 | 5/2011 | Nielsen et al. |
| 8,531,332 B2 | 9/2013 | Gum et al. |

(Continued)

OTHER PUBLICATIONS

"Global Positioning System Standard Positioning Service Performance Standard, 4th edition", U.S. Department of Defense, (Sep. 2008), 160 pgs.

(Continued)

*Primary Examiner* — Evral E Bodden
(74) *Attorney, Agent, or Firm* — Schwegman Lundberg & Woessner, P.A.

(57) ABSTRACT

A computer architecture for geolocation spoofing/meaconing detection is disclosed. According to some aspects, a computer accesses an incoming geolocation positioning signal. The computer determines, using a signal characteristics calculation subsystem, geolocation positioning signal characteristics for the incoming geolocation positioning signal. The computer provides, using a geolocation positioning spoofing/meaconing detection subsystem, the geolocation positioning signal characteristics as an input vector to a neural network, wherein the neural network determines whether the incoming geolocation positioning signal is legitimate or fake. If the incoming geolocation positioning signal is determined to be fake: the computer computes, using a Bayesian inference subsystem, a likelihood and a severity of a geolocation positioning technology based attack. The computer provides, as a digital transmission, an indication of whether the incoming geolocation positioning signal is legitimate or fake.

20 Claims, 9 Drawing Sheets

(51) Int. Cl.
*G06N 20/00* (2019.01)
*G06N 7/00* (2006.01)
*G06N 3/08* (2006.01)

(58) Field of Classification Search
USPC .................................................. 342/357.59
See application file for complete search history.

(56) References Cited

U.S. PATENT DOCUMENTS

| | | | |
|---|---|---|---|
| 8,712,051 | B2 | 4/2014 | Psiaki |
| 8,922,427 | B2 | 12/2014 | Dehnie et al. |
| 11,097,241 | B2* | 8/2021 | Kim ........................ A23K 50/00 |
| 2012/0121087 | A1 | 5/2012 | Psiaki |
| 2015/0226857 | A1 | 8/2015 | Davies |
| 2015/0234053 | A1 | 8/2015 | Psiaki et al. |
| 2018/0121777 | A1* | 5/2018 | Torrent ................... G06Q 50/28 |
| 2019/0353822 | A1* | 11/2019 | Labov ................... G01V 5/0091 |

OTHER PUBLICATIONS

Ebinuma, Takuji, "OSQZSS Software-Defined GPS Signal Simulator", GitHub, [Online]. Retrieved from the Internet: <URL: https://github.com/osqzss/gps-sdr-sim/blob/master/README>, (Accessed Apr. 3, 2019), 3 pgs.

Humphreys, T, et al., "Assessing the Spoofing Threat: Development of a Portable GPS Civilian Spoofer", ION GNSS Conference, (2008), 2314-2325.

Humphreys, T, "Statement on the Vulnerability of Civil Unmanned Aerial Vehicles and Other Systems to Civil GPS Spoofing", The University of Texas at Austin, Tech. Rep., (2012), 16 pgs.

Jansen, K, et al., "Crowd-GPS-Sec: Leveraging Crowdsourcing to Detect and Localize GPS Spoofing Attacks", IEEE Symposium on Security and Privacy, (2018), 1-14.

Kerns, J, et al., "A Blueprint for Civil GPS Navigation Message Authentication", IEEE/ION PLANS meeting, (2014), 262-269.

Magiera, J, et al., "Detection and Mitigation of GPS Spoofing Based on Antenna Array Processing", Journal of Applied Research and Technology, vol. 13, (2015), 47-57.

Manesh, M, et al., "A Preliminary Effort Toward Investigating the Impacts of ADS-B Message Injection Attack", IEEE Aerospace Conference, (2018), 6 pgs.

Manesh, M, et al., "An Optimized SNR Estimation Technique Using Particle Swarm Optimization Algorithm", IEEE Computing and Communication Workshop and Conference, (2017), 1-7.

Manesh, M, et al., "Analysis of Vulnerabilities, Attacks, Countermeasures and Overall Risk of the Automatic Dependent Surveillance-Broadcast (ADS-B) System", International Journal of Critical Infrastructure Protection, (2017), 37 pgs.

Manesh, M, et al., "Detection of GPS Spoofing Attacks on Unmanned Aerial Systems", IEEE Annual Consumer Communication & Networking Conference, (2019), 6 pgs.

Nielsen, M, "Chapter 2: How the backpropagation algorithm works", Neural Networks and Deep Learning, Determination Press, vol. 25, (2015), 39-58.

O'Hanlon, B, et al., "Real-Time GPS Spoofing Detection via Correlation of Encrypted Signals", Navigation, vol. 60, No. 4, pp. 267-278, (2013), 20 pgs.

Panice, G., et al., "A SVM-Based Detection Approach for GPS Spoofing Attacks To UAV", IEEE international Conference on Automation and Computing (iCAC), (2017), 1-11.

Psiaki, M, et al., "Attackers Can Spoof Navigation Signals Without Our Knowledge. Here's How to Fight Back GPS Lies", IEEE Spectrum, vol. 53, No. 8, (2016), 26-53.

Psiaki, M, et al.. "GNSS Spoofing and Detection", Proceedings of the IEEE, vol. 104, No. 6, (2016), 1258-1270.

Ranganathan, A, et al., "Short Paper: Detection of GPS Spoofing Attacks in Power Grids", ACM Conference on Security and Privacy in Wireless and Mobile Networks, (2014), 99-104.

Ranganathan, A, et al., "SPREE: A Spoofing Resistant GPS Receiver", ACM Conference on Mobile Computing and Networking, (2016), 348-360.

Tippenhauer, N, et al., "On the Requirements for Successful GPS Spoofing Attacks", ACM Conference on Computer and Communications Security, (2011), 75-86.

Volpe, John A, "Vulnerability Assessment of the Transportation Infrastructure Relying on the Global Positions System", U.S. Department of Transportation, (Aug. 29, 2001), 113 pgs.

Wesson, K, et al., "Practical Cryptographic Civil GPS Signal Authentication", The Journal of the Institute of Navigation pp. 3335-3345 at the International Technical Meeting of The Satellite Division of the Institute of Navigation, (2012), 15 pgs.

* cited by examiner

DETECTION OF SPOOFING AND MEACONING FOR GEOLOCATION POSITIONING SYSTEM SIGNALS

PRIORITY CLAIM

This application claims priority to U.S. Provisional Patent Application No. 62/790,575, filed on Jan. 10, 2019, entitled "DETECTION OF SPOOFING AND MEACONING FOR GEOLOCATION POSITIONING SYSTEM SIGNALS," the entire content of which is incorporated herein by reference.

GOVERNMENT SUPPORT CLAUSE

This invention was made with government support under Grant No. OIA-1355466 awarded by the National Science Foundation. The government has certain rights in the invention.

TECHNICAL FIELD

Embodiments pertain to computer architecture. Some embodiments relate to geolocation technologies. Some embodiments relate to detection of spoofing and meaconing for geolocation positioning system signals.

BACKGROUND

Geolocation systems, such as global positioning system (GPS), are ubiquitous and are implemented in many different areas, such as mobile phones, autonomous and human-controlled cars, aviation, military, and the like. However, many geolocation systems, for example the GPS system, are not secure. Thus, it is relatively easy to generate a fake geolocation signal. As the foregoing illustrates, techniques to recognize fake geolocation signals are desirable.

SUMMARY

Figure 1:
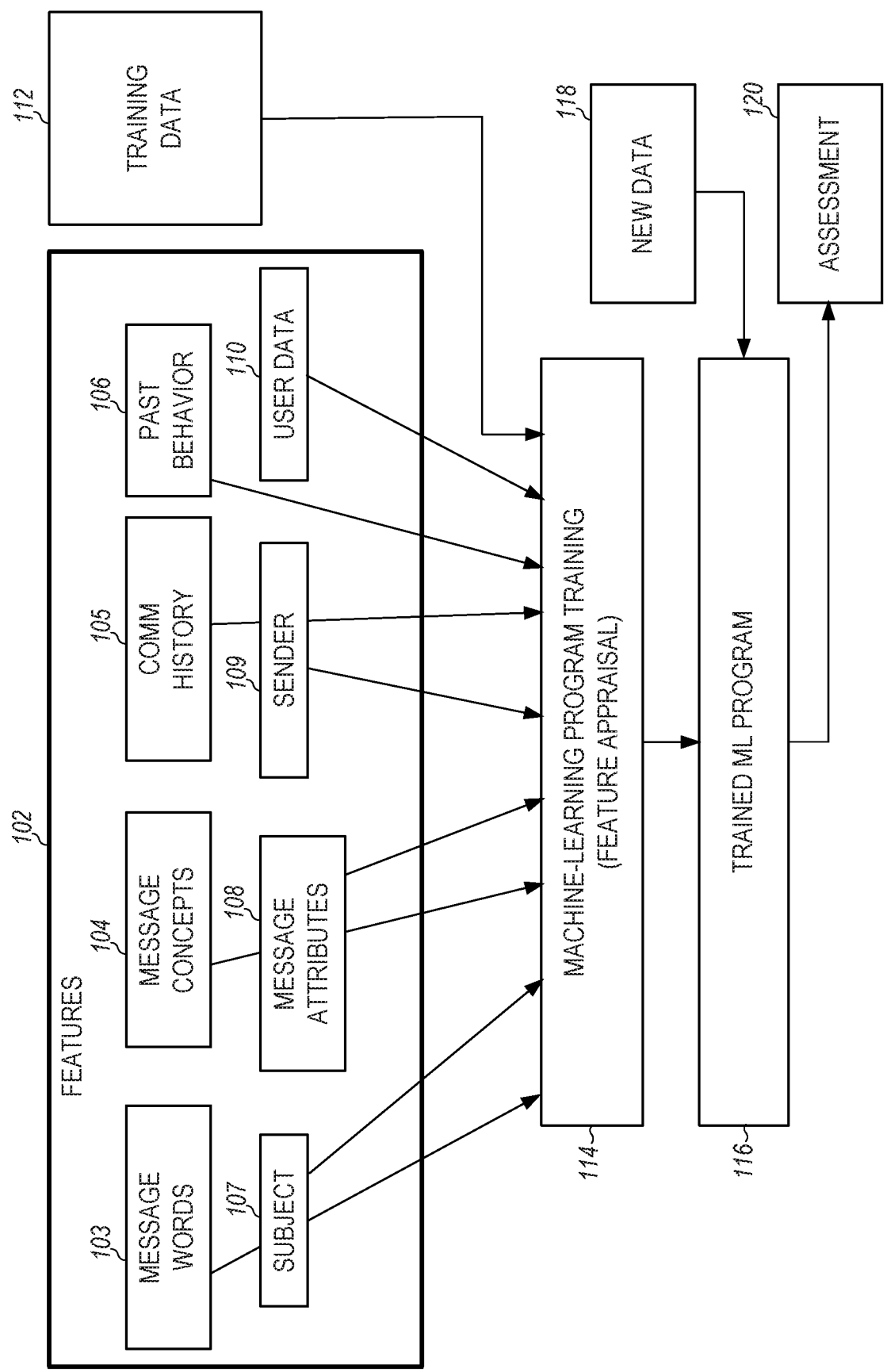
FIG. 1 illustrates the training and use of a machine-learning program, in accordance with some embodiments.

The present disclosure generally relates to machines configured to provide neural networks, including computerized variants of such special-purpose machines and improvements to such variants, and to the technologies by which such special-purpose machines become improved compared to other special-purpose machines that provide technology for neural networks. In particular, the present disclosure addresses systems and methods for multiplier-less neural networks.

According to some aspects of the technology described herein, a geolocation spoofing/meaconing detection apparatus include processing circuitry and memory. The processing circuitry accesses an incoming geolocation positioning signal. The processing circuitry determines, using a signal characteristics calculation subsystem, geolocation positioning signal characteristics for the incoming geolocation positioning signal. The processing circuitry provides, using a geolocation positioning spoofing/meaconing detection subsystem, the geolocation positioning signal characteristics as an input vector to a neural network, wherein the neural network determines whether the incoming geolocation positioning signal is a legitimate geolocation positioning signal or a fake geolocation positioning signal, wherein the neural network comprises at least an input layer, one or more hidden layers, and an output layer. In a case where the incoming geolocation positioning signal is determined to be the fake geolocation positioning signal: the processing circuitry computes, using a Bayesian inference subsystem, a likelihood and a severity of a geolocation positioning technology based attack. The processing circuitry provides, as a digital transmission, an indication of whether the incoming geolocation positioning signal is the legitimate geolocation positioning signal or the fake geolocation positioning signal and, in the case where the incoming geolocation positioning signal is determined to be the fake geolocation positioning signal, the likelihood and the severity of the geolocation positioning technology based attack.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, geolocation systems, such as global positioning system (GPS), are ubiquitous and are implemented in many different areas, such as mobile phones, autonomous and human-controlled cars, aviation, military, and the like. However, many geolocation systems, for example the GPS system, are not secure. Thus, it is relatively easy to generate a fake geolocation signal. As the foregoing illustrates, techniques to recognize fake geolocation signals are desirable.

Aspects of the technology are described herein with reference to GPS. However, any other satellite-based or non-satellite-based geolocation technology may be used (in place of GPS or in addition to GPS) to implement the techniques described herein. For example, a ground-based geolocation positioning system or a mobile-based geolocation positioning system may be used in place of GPS.

The operation of autonomous systems, such as Unmanned Aerial Systems, is highly dependent on several sensors including GPS. The GPS worldwide coverage has made this system a standard means for navigation and tracking purposes. In addition, numerous devices use GPS for accurate localization or precise time synchronization. The GPS receiver receives the signals from four or more satellites and calculates its three-dimensional position. However, the public civilian GPS is not secure because of unauthenticated and unencrypted transmission of signals by the satellites. This makes GPS receivers vulnerable to a category of cyberattacks known as GPS spoofing. In this attack, a malicious user transmits fake signals similar to those transmitted by GPS satellites but sometimes at a higher power. The fake signals can be created by one or both of the following two approaches: (1) the attacker can generate fake signals from scratch; and (2) the attacker can record legitimate GPS signals at a first location and rebroadcast them later at another location. This second approach is called GPS meaconing. In both cases, by modifying the time delays and information in the signals, the attacker can make the GPS receiver calculate an arbitrary position. By the presence of cheap commercial off-the-shelf software and hardware, the cost of launching these attacks has significantly dropped and the number of attacks has increased.

As the foregoing illustrate, technology to detect fake geolocation positioning signal(s) is desirable. If fake geolocation positioning signal(s) are detected, technology to determine the likelihood and the severity of a geolocation positioning technology based attack is desirable. According to some implementations, the technology described herein is directed to, among other things, detecting fake geolocation positioning signal(s). According to some implementations, the technology described herein is directed to, among other things, determining the likelihood and the severity of a geolocation positioning technology based attack.

According to some implementations, a computing device includes processing circuitry, memory, and a geolocation positioning receiver (GPR). The GPR may be a GPS receiver or a receiver for any other geolocation positioning technology. The GPR receives an incoming geolocation positioning signal. The processing circuitry accesses, from the GPR, the incoming geolocation positioning signal. The processing circuitry determines, using a signal characteristics calculation subsystem, geolocation positioning signal characteristics for the incoming geolocation positioning signal. The processing circuitry provides, using a geolocation positioning spoofing/meaconing detection subsystem, the geolocation positioning signal characteristics as an input vector to a neural network. The neural network determines whether the incoming geolocation positioning signal is a legitimate geolocation positioning signal or a fake geolocation positioning signal. The neural network comprises at least an input layer, one or more hidden layers, and an output layer. In a case where the incoming geolocation positioning signal is determined to be the fake geolocation positioning signal: the processing circuitry computes, using a Bayesian inference subsystem, a likelihood and a severity of a geolocation positioning technology based attack. The processing circuitry provides, as a digital transmission, an indication of whether the incoming geolocation positioning signal is the legitimate geolocation positioning signal or the fake geolocation positioning signal and, in the case where the incoming geolocation positioning signal is determined to be the fake geolocation positioning signal, the likelihood and the severity of the geolocation positioning technology based attack.

In some cases, the technology described herein leverages machine learning computer architecture to allow for detection of fake geolocation positioning signal(s) or geolocation positioning technology based attack(s) at a device that includes the GPR. The technology might, in some cases, not require any changes to global positioning transmitters (GPTs), such as GPS satellites. As a result, the technology may be implemented, with relatively low cost, on sensitive devices (e.g. military or aviation devices) that include GPR(s). The technology may be hardwired into processing circuitry or may be implemented using software stored in memory. In some cases, the technology may be implemented in combinations of software and hardware.

In some cases, the technique disclosed herein does not use any additional information from sources such as the inertial reference system and position sensors. It simply extracts information from the geolocation positioning signals and detects signals corresponding to geolocation positioning spoofing attacks.

The technology disclosed herein may include one or more of the following features: does not need any modification to the previously existing geolocation positioning infrastructure; can be implemented on any system with a GPR; the cost, size, and complexity are much lower than those of some other solutions; ability to detect geolocation positioning spoofing and meaconing attacks; high accuracy in detecting all attacks; low rate of false alarms; and fast detection.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
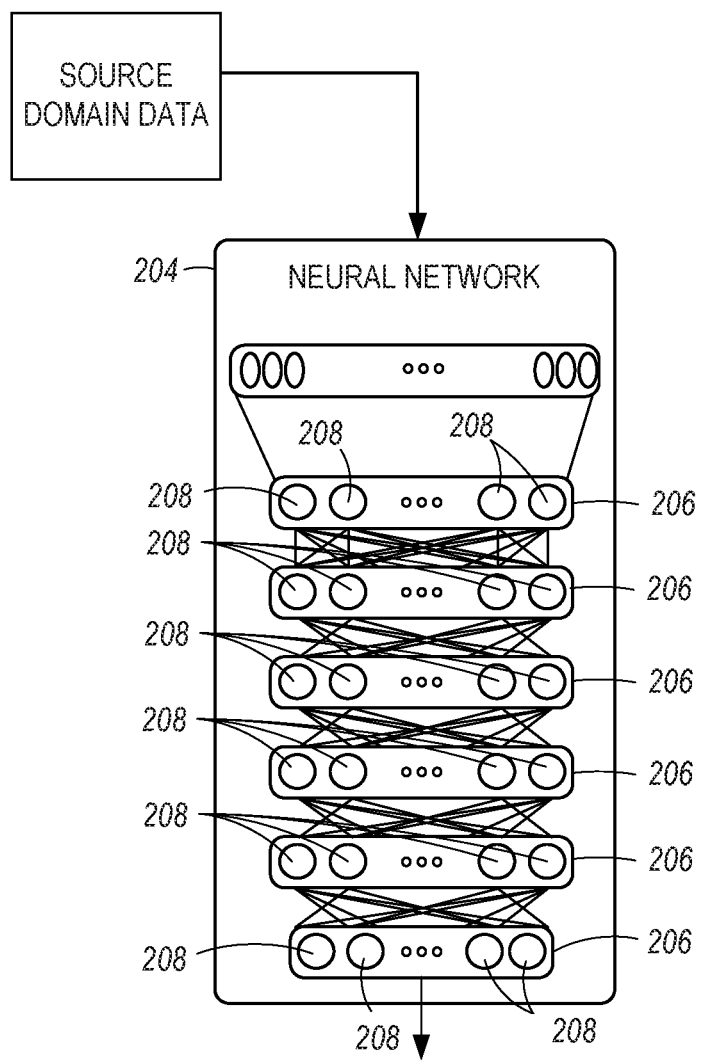
FIG. 2 illustrates an example neural network, in accordance with some embodiments.
Figure 2:
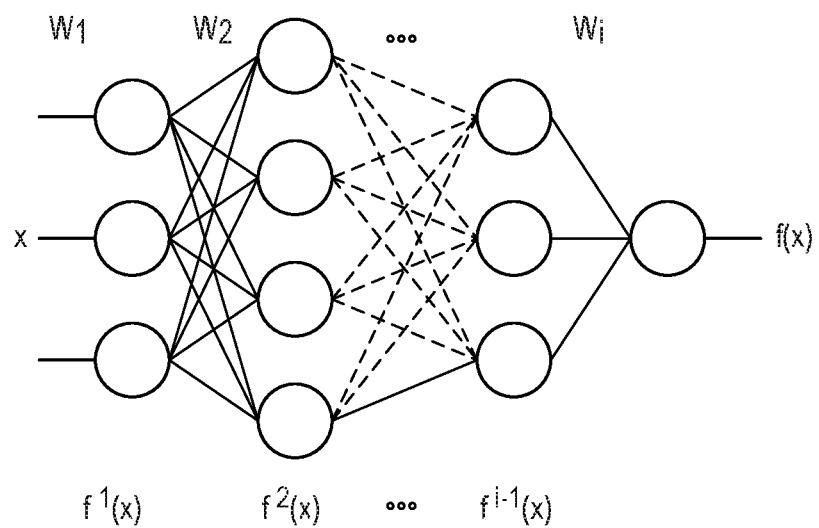

FIG. 2 illustrates an example neural network 204, in accordance with some embodiments. As shown, the neural network 204 receives, as input, source domain data 202. The input is passed through a plurality of layers 206 to arrive at an output. Each layer includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{-1}(x)$, until finally the output $f(x)$ is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
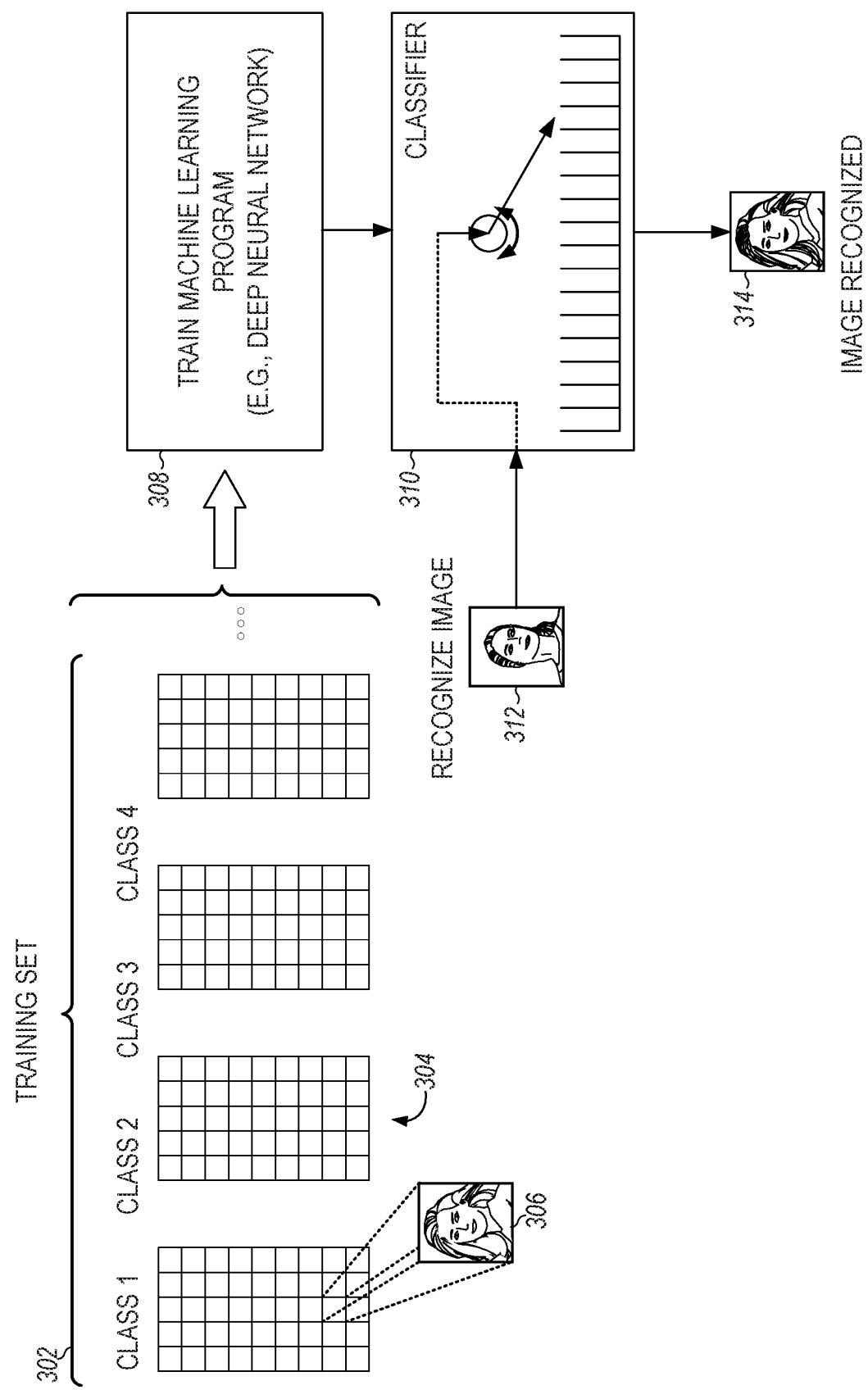
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
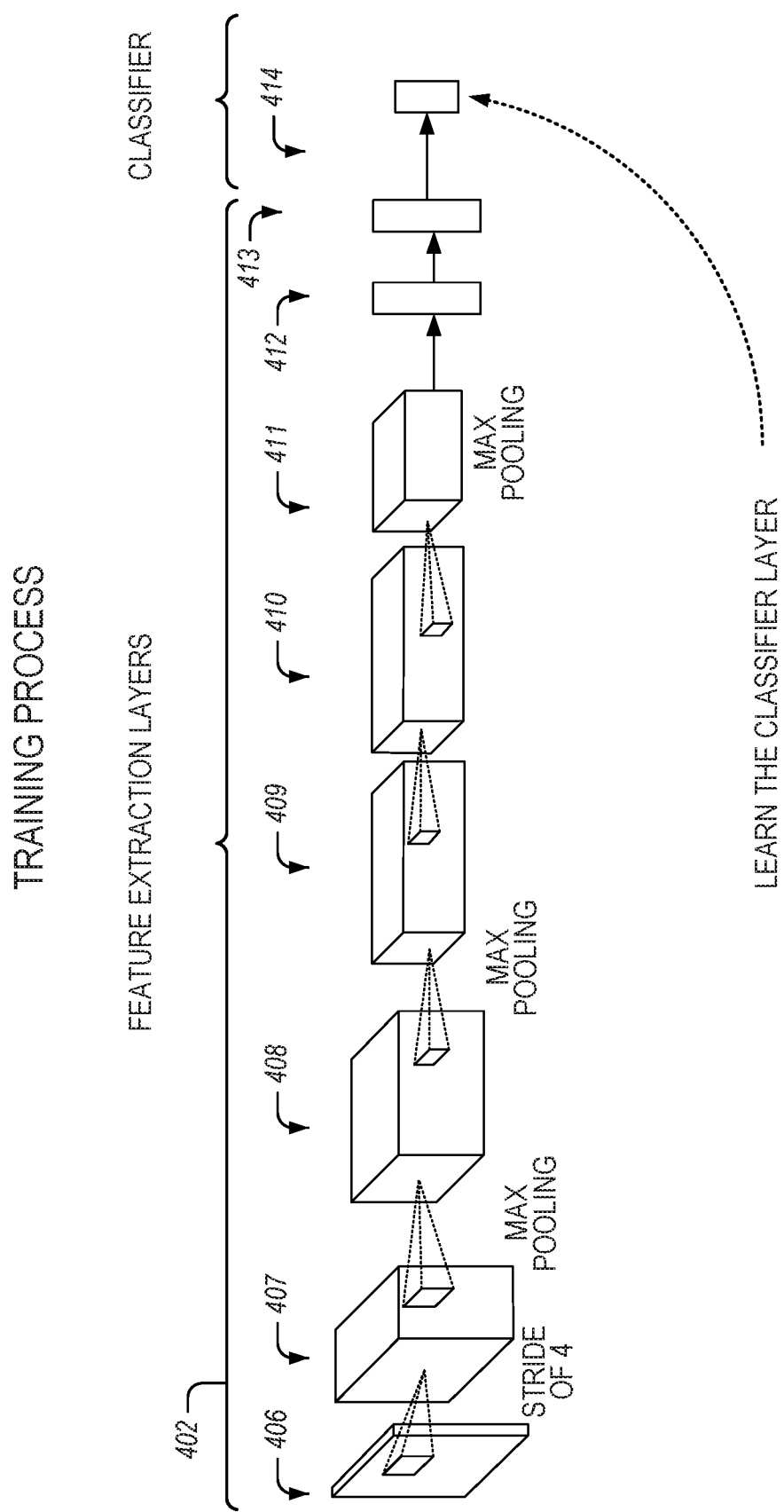
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
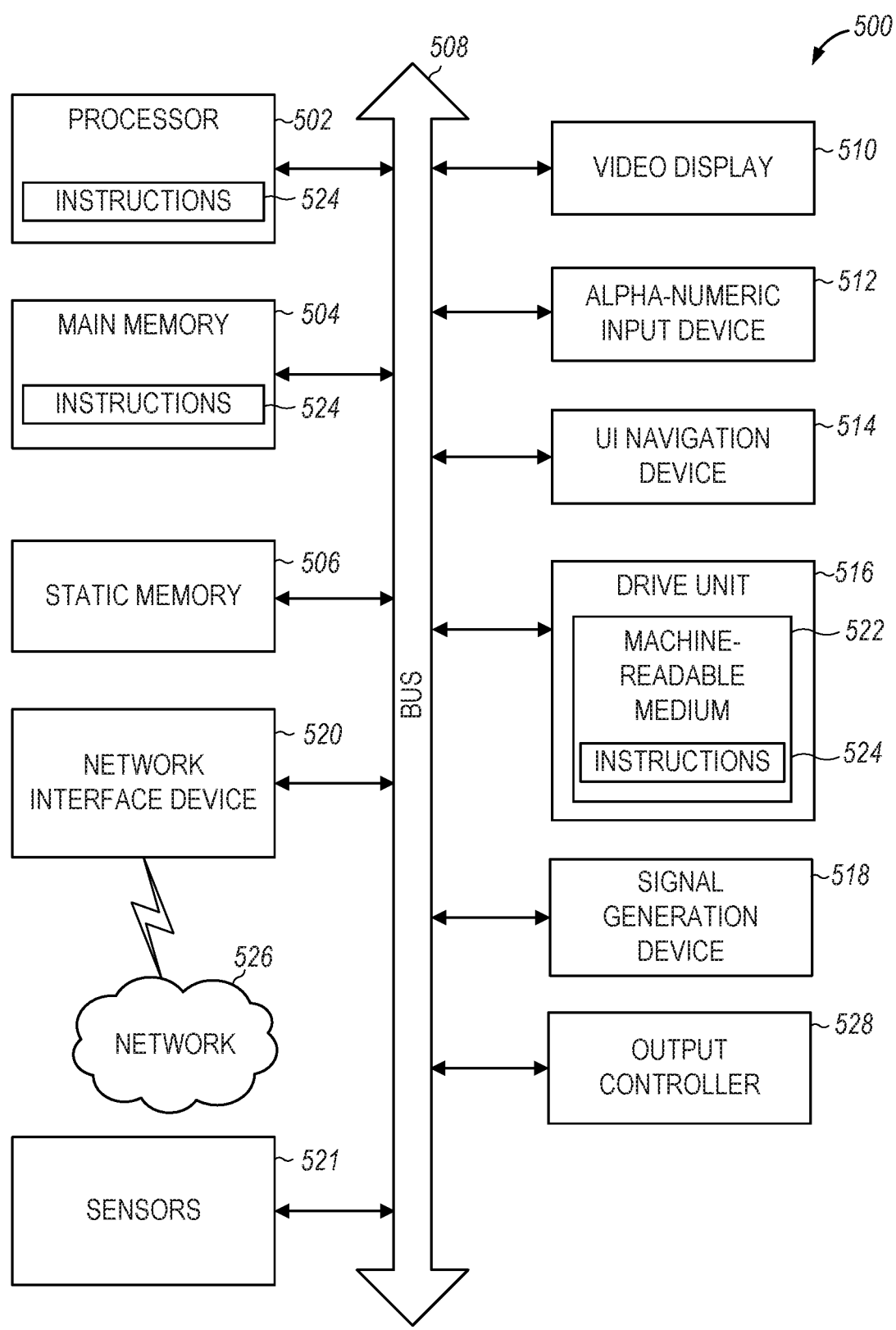
FIG. 5 is a block diagram of a computing machine, in accordance with some embodiments.

FIG. 5 illustrates a block diagram of a computing machine 500 in accordance with some embodiments. In some embodiments, the computing machine 500 may store the components shown in the circuit block diagram of FIG. 5. For example, the circuitry 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
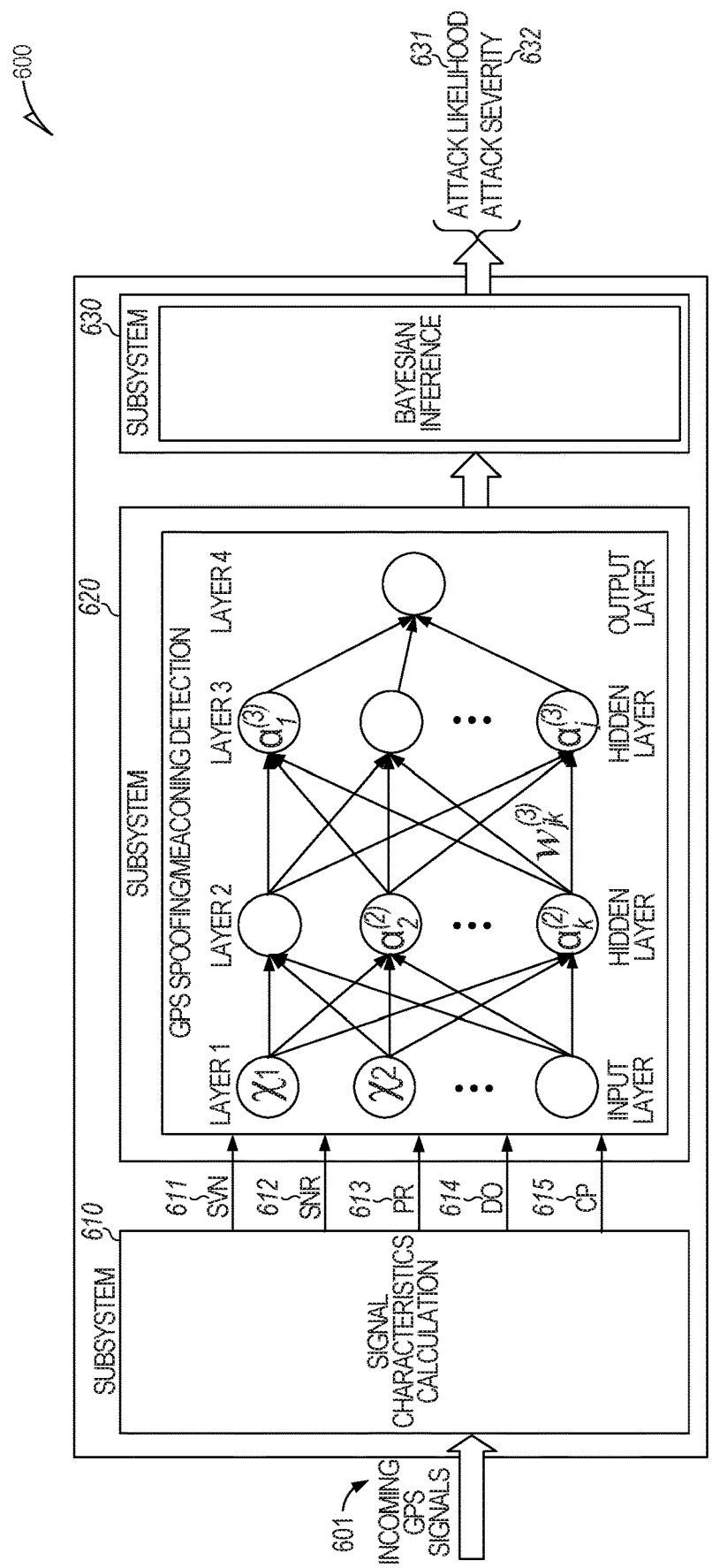
FIG. 6 illustrates an example system in which geolocation spoofing/meaconing detection may be implemented, in accordance with some embodiments.
Figure 7:
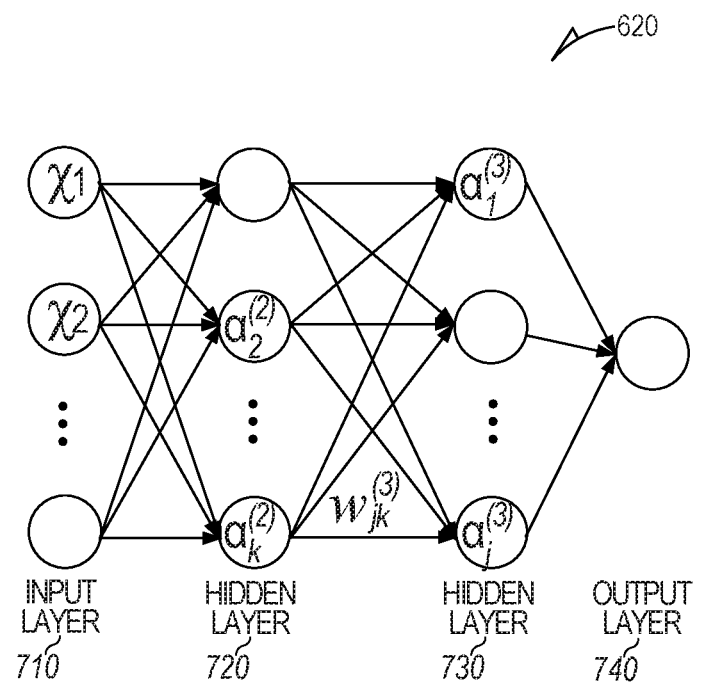
FIG. 7 illustrates an example neural network which may be used for geolocation spoofing/meaconing detection, in accordance with some embodiments.

Aspects of the technology disclosed herein are described in FIGS. 6-7 in connection with GPS. However, it should be noted that any geolocation positioning technology may be used in place of GPS. The technology disclosed herein is not limited to GPS-based implementations.

FIG. 6 illustrates an example system 600 in which geolocation spoofing/meaconing detection may be implemented, in accordance with some embodiments. As shown, the system 600 includes a signal characteristics calculation subsystem 610, a geolocation positioning (e.g., GPS) spoofing/meaconing detection subsystem 620, and a Bayesian inference subsystem 630.

The signal characteristics calculation subsystem 610 receives, as input, an incoming GPS signal 601. The signal characteristics subsystem 610 computes, for the incoming GPS signal 601 one or more of the following: satellite vehicle number (SVN) 611, signal-to-noise ratio (SNR) 612, pseudo-range (PR) 613, Doppler shift (DO) 614, and carrier phase shift (CP) 615.

In GPS implementations, the satellite vehicle number 611 is used to identify different satellites orbiting the earth. This number can be simply read from the contents of decoded received GPS signals. In some non-GPS (or GPS-based) implementations, the SVN 611 may be replaced with a GPT location. The GPT location may be read from the incoming GPS signal 601. In some cases, the GPT location is represented by the SVN 611 or includes the SVN 611.

The SNR 612 is an indicator of how strong the signal that carries the GPS information is after it is mixed with noise and interference. It can be measured and calculated using the Eigenvalues of the received signal covariance matrix. To calculate the Eigenvalues, $N_t$ received signal samples, x[n], are obtained and stored in an array as:

$$[x[0], x[1], x[2], \ldots, x[N_t-1]] \quad (1)$$

An L×$N_t$ dimension matrix is formed, where each row of the matrix is comprised of L time-shifted versions of the received signal samples x[n], as shown by:

$$X = \begin{pmatrix} x_{1,1} & \cdots & x_{1,N} \\ \vdots & \ddots & \vdots \\ x_{L,1} & \cdots & x_{L,N} \end{pmatrix} \quad (2)$$

In Equation (2), $x_{i,j}$ is the received signal vector sample, L is the number of Eigenvalues and $N_t$ is the length of the received signal vector. The sample covariance matrix is computed as the product of the matrix, X, and its Hermitian transpose, $X^H$, averaged over $N_t$ samples, which is given by:

$$\hat{R}_x = \frac{1}{N_t} XX^H \quad (3)$$

The Eigenvalues of the resulting L×L matrix and their mean are then computed. Next, a value, M, is estimated using the maximum descriptive length. After estimating M, the array of Eigenvalues is split to two groups: noise group and transmitted signal group. Then, based on two distribution namely Marchenko-Pastur distribution and empirical distribution of noise group Eigenvalues, the noise power is estimated, which can lead to the computation of the SNR 612.

In computing the PR 613, it should be noted that, in GPS implementations, the Gold code unique to each satellite has the property that its autocorrelation is constant until it gets within a window of one chip. During this window, the autocorrelation function has an equilateral triangle shape, where its peak happens when the correlation is perfect. This characteristic can be used to find the travel time of the signal from the satellite to the receiver by the receiver cross-correlating the Gold code with its receiver-generated replica. This calculated time difference, ΔT, along with the speed of light is used to estimate the distance, pseudo range, between the satellite and the receiver, as follows:

$$PR = \Delta T.c = (T-T_s).c \quad (4)$$

To calculate DO 614, at the GPR, the incoming geolocation positioning signal, g(t), is multiplied by a reference signal, $f(t)$, as follows:

$$g(t) \times f(t) = A_g \sin(2\pi\varphi_g(t)) \times A_0 \sin(2\pi\varphi_0(t)) = \quad (5)$$
$$\frac{A_g A_0}{2}[\cos 2\pi(\varphi_0(t) - \varphi_g(t)) - \cos 2\pi(\varphi_0(t) + \varphi_g(t))]$$

In Equation (5), $A_g$, $\varphi_g(t)$, $A_0$, and $\varphi_0(t)$ are amplitudes and phases of the incoming geolocation positioning signal and the reference signal, respectively. The higher frequency component can be filtered out, keeping the lower frequency component, as follows:

$$b(t) = \text{Filter}\{g(t) \times f(t)\} = \frac{A_g A_f}{2} \cos 2\pi(\varphi_0(t) - \varphi_g(t)) \quad (6)$$

The phase difference of the geolocation positioning signal and the reference signal is defined as:

$$\varphi_d(t) = \varphi_0(t) - \varphi_g(t) - P \quad (7)$$

In Equation (7), P is phase ambiguity. By differentiating Equation (7) with respect to time, the frequency difference between the incoming geolocation positioning signal and the reference signal is calculated. This difference is an indicator of Doppler shift, $f_d$:

$$f_d = \frac{d\varphi_d(t)}{dt} = f_0 - f_g \quad (8)$$

In computing CP 615, per Equation (7), the carrier phase shift observed at time T may be rewritten as follows:

$$\varphi(T) = \varphi_0(T) - \varphi_g(T) - P \quad (9)$$

The observation time as a function of phase and frequency may be written as follows:

$$T = \frac{\varphi(T) - \varphi_0}{f_0} \quad (10)$$

Therefore, considering that the incoming signal phase received at time T is identical to the transmitted signal at time $T^S$, the carrier phase observable from satellite (or other GPT) S is:

$$\varphi^S(T) = f_0 T + \varphi_0 - f_0 T^S - \varphi_0^S - P^S \quad (11)$$

Equation (11) can be extended to include multiple receivers and satellites (or other GPTs) as follows:

$$\varphi_j^i(T_j) = f_0 T_j + \varphi_{0,j} - f_0 T^i - \varphi_0^i - P_j^i \quad (12)$$

In Equation (12), i and j are used to identify an arbitrary satellite (or other GPT) and an arbitrary receiver, respectively.

FIG. 7 illustrates an example neural network which may be used for geolocation spoofing/meaconing detection, in accordance with some embodiments. The geolocation positioning spoofing/meaconing detection subsystem 620 is illustrated in detail in FIG. 7, and may be implemented using a neural network.

As shown, the neural network of the geolocation positioning spoofing/meaconing detection subsystem 620 includes an input layer 710, hidden layers 720 and 730, and an output layer 740. While two hidden layers 720 and 730 are illustrated, the neural network may have any number (e.g. 1, 2, 3, 4 or more than 4) of hidden layers. As shown, each layer from among the input layer 710 and the hidden layers 720 and 730 may have multiple neurons. In some implementations, for example, as illustrated in FIG. 7, the output layer 740 includes only a single neuron.

The geolocation positioning spoofing/meaconing detection subsystem 620 implements a machine learning algorithm based on neural networks for detecting geolocation positioning spoofing and meaconing attacks. It classifies the incoming signals in real-time based on the characteristics of the input signal.

The geolocation positioning spoofing/meaconing detection subsystem 620 uses a neural network to process its input parameters (SVN 611, SNR 612, PR 613, DO 614, and CP 615) to provide the Bayesian inference subsystem 630 with a binary decision about the presence or absence of the fake global positioning signal (i.e. whether the global positioning signal is legitimate or fake).

The input layer 710 receives the input parameters for the neural network. The output layer 740 generates an output representing whether the global positioning signal is legitimate or fake.

Given the input vector $(a_j^{(1)}=x_j, j=1, \ldots 5)$, initialized weights, and initialized bias values to the neural network, the output, $a_1^{(4)}$, which is the prediction on the presence or absence of the attacker, can be computed as:

$$z_j^{(l)} = \Sigma_k w_{jk}^{(l)} a_k^{(l-1)} + b_j^{(l)}, l=1, \ldots, 4 \quad (13)$$

$$a_j^{(l)} = g(z_j^{(l)}), l=1, \ldots, 4 \quad (14)$$

where the activation and bias of neuron j in layer l are denoted by $a_j^{(l)}$ and $b_j^{(l)}$, respectively, the weight from the $k^{th}$ neuron in the $(l-1)^{th}$ layer to the $j^{th}$ neuron in the $l^{th}$ layer is denoted by $w_{jk}^{(l)}$ and g(.) is called the activation function. In some cases, the activation function used is hyperbolic tangent (tanh) which is given by:

$$g_{tanh}(z) = \frac{2}{1+e^{-2z}} - 1 \quad (15)$$

Alternatively, other activation function(s) may be used in place of the hyperbolic tangent function.

FIG. 6 also shows the Bayesian inference subsystem 630. In a case where the incoming geolocation positioning signal 601 is determined, by the subsystem 620, to be the fake geolocation positioning signal: the Bayesian inference subsystem 630 computes a likelihood and a severity of a geolocation positioning technology based attack.

The subsystem 630 uses the concept of Bayesian inference in which prior knowledge of the attacks is used to compute the posterior probability distribution of the attacks when a new geolocation positioning signal is received. This posterior probability, $Post_{Att}$, is calculated as:

$$Post_{Att} = Prior_{Att} \times Lik_{Att} \quad (16)$$

$$Lik_{Att} = (P_{Att})^{ATProb} \times (1-P_{Att})^{1-ATProb} \quad (17)$$

In Equation (17), $P_{Att}$ denotes the set of probability values from 0 to 1, ATProb is the attack presence probability, which depends on the probabilities of detection and false alarm for the attack detection technique, $Prior_{Att}$ is the prior probability distribution, and $Post_{Att}$ is the posterior probability distribution. The maximum value of $Post_{Att}$ is considered as the attack rate and taken as $Prior_{Occ}$ for the next iteration.

The probabilities of detection and false alarm represent how accurate the detection technique is. Therefore, in order to include detection inaccuracies in the estimation of the attack rate, we define ATProb as a probability conditioned to these two parameters. When an attack is detected, $A_D$=1, the attack presence probability can be given as follows:

$$ATProb = P(A_P = 1 | A_D = 1) = \quad (18)$$
$$\frac{P(A_D = 1 | A_P = 1)P(A_P = 1)}{P(A_D = 1 | A_P = 1)P(A_P = 1) + P(A_D = 1 | A_P = 0)P(A_P = 0)} = \frac{P_D P(A_P = 1)}{P_D P(A_P = 1) + P_{FA} P(A_P = 0)}$$

In Equation (18), $A_P$ denotes the attack presence, $A_D$ denotes the decision of the detection technique, $P(A_P=1)$ and $P(A_P=0)$ are the a priori probabilities that the attack is present and absent, respectively, $P(A_D=1|A_P=1)$ represents the probability of detection, $P_D$, and $P(A_D=1|A_P=0)$ represents the false alarm probability, $P_{FA}$. When no attack is detected, $A_D$=0, the attack presence probability is given by:

$$ATProb = P(A_P = 1 | A_D = 0) = \frac{P(A_D = 0 | A_P = 1)P(A_P = 1)}{P(A_D = 0 | A_P = 1)P(A_P = 1) + P(A_D = 0 | A_P = 0)P(A_P = 0)} = \quad (19)$$
$$\frac{P_{MD} P(A_P = 1)}{P_{MD} P(A_P = 1) + (1 - P_{FA})P(A_P = 0)}$$

In Equation (19), $P(A_D=0|A_P=1)$ represents the probability of misdetection, $P_{MD}$. After calculating ATProb, the attack rate can be calculated by finding the maximum of $Post_{Att}$.

As shown, the Bayesian inference subsystem 630 outputs an attack likelihood 631 and an attack severity 632. The presence or absence of an attack, as well as the attack severity 632 may be provided to an end-user (e.g., via a digital transmission to a display device or over a network) in a color coded visual output. In one example, green represents no attack, yellow represents an attack with low to medium severity, and red represents an attack with medium to high severity.

Figure 8:
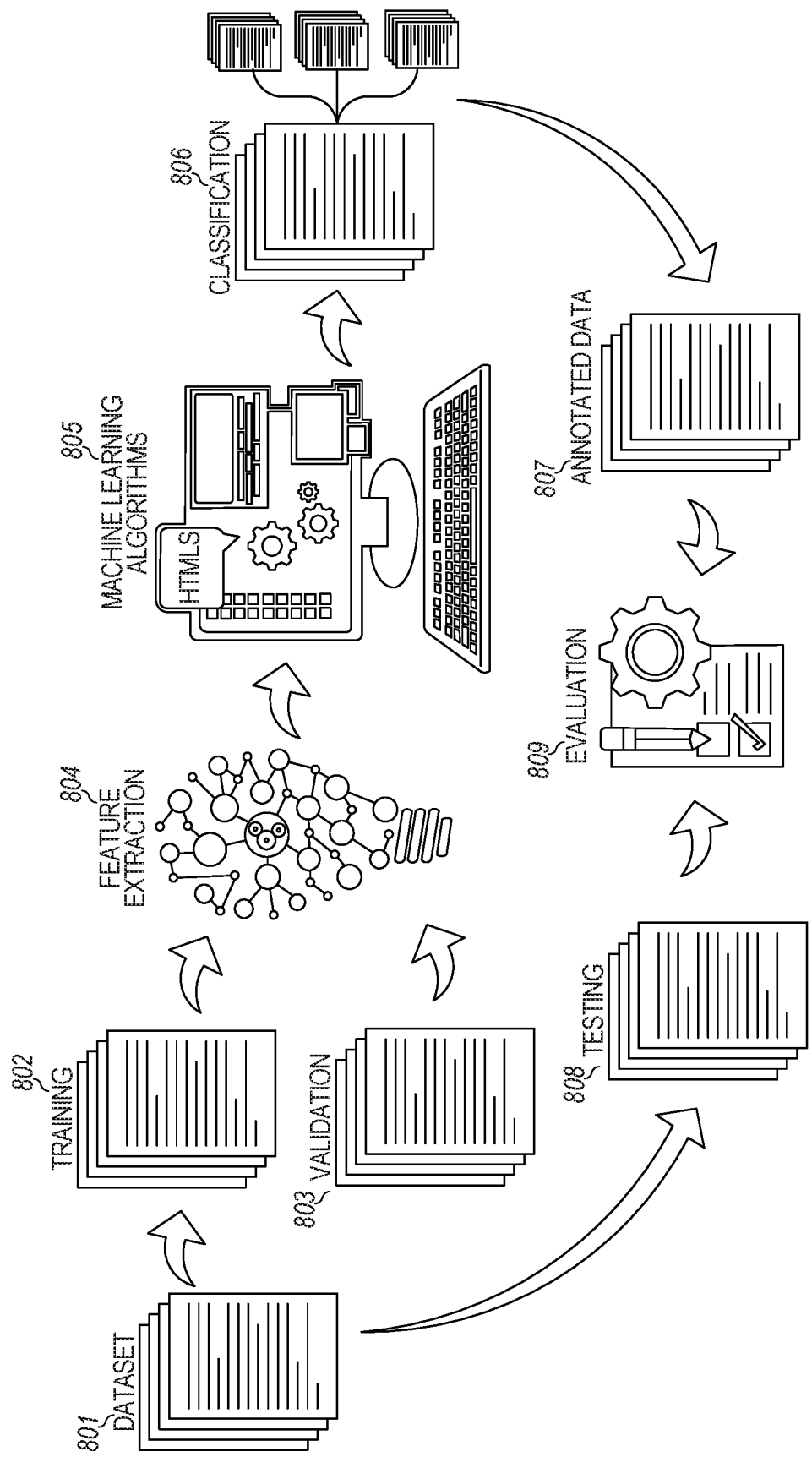
FIG. 8 is a data flow diagram of training, validation, and testing of a neural network for geolocation spoofing/meaconing detection, in accordance with some embodiments.

FIG. 8 is a data flow diagram 800 of training, validation, and testing of a neural network for geolocation spoofing/meaconing detection, in accordance with some embodiments.

As shown in the data flow diagram 800, a dataset 801 is provided. The dataset 801 includes legitimate geolocation positioning signals and fake geolocation positioning signals that are or are not associated with attack(s) at various severity levels. The dataset 801 is separated into a training portion 802, a validation portion 803, and a testing portion 808. Feature extraction 804 (of the features 611-615 described above) is applied to the data in the training portion 802 and the validation portion 803. Machine learning algorithm(s) 805 (e.g. the neural network in the subsystem 620) are applied to the output of the feature extraction 804, leading to a classification 806. The classification 806 results in annotated data 807. The annotated data 807 and the testing data 808 are provided for evaluation 809. In the evaluation 809 phase, the testing data 808 is used to test the trained machine learning algorithms 805.

Figure 9:
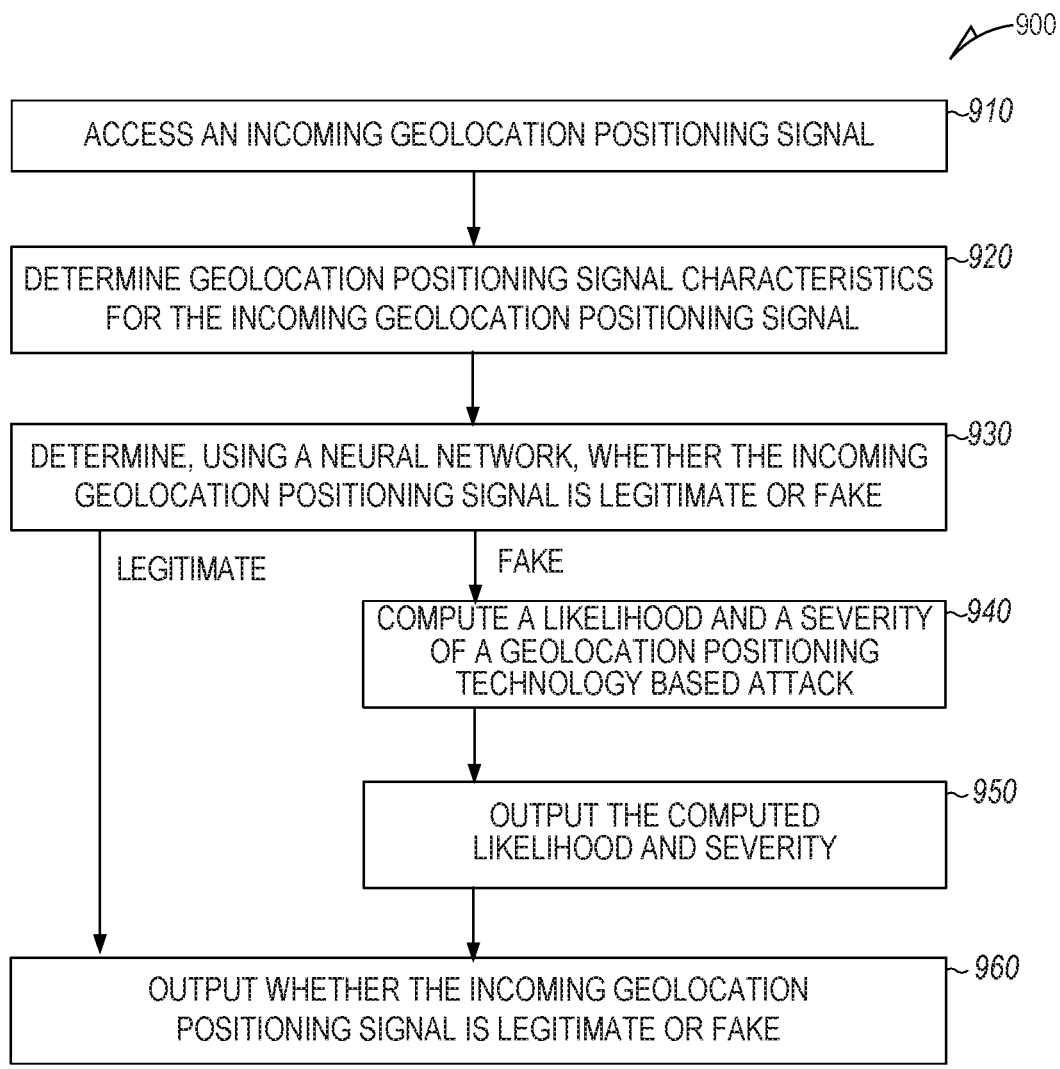
FIG. 9 is a flow chart of a method for geolocation spoofing/meaconing detection, in accordance with some embodiments.

FIG. 9 is a flow chart of a method 900 for geolocation spoofing/meaconing detection, in accordance with some embodiments.

At operation 910, a computing machine, which includes processing circuitry, memory, and a GPR, accesses an incoming geolocation positioning signal 601. The geolocation positioning signal may be one of multiple (e.g. at least four for a three-dimensional position or at least three for a two-dimensional position) signals used to determine a geographic location of the computing machine. In some examples, the GPR receives the incoming geolocation positioning signal 601 and provides the incoming geolocation positioning signal for access by the processing circuitry. In some examples, the GPR is a GPS receiver.

At operation 920, the computing machine determines, using a signal characteristics calculation subsystem 610, geolocation positioning signal characteristics for the incoming geolocation positioning signal. In some cases, the geolocation positioning signal characteristics include one or more of: a geolocation positioning transmitter (GPT) location, a signal-to-noise ratio (SNR), a pseudo-range (PR), a Doppler shift (DO), and a carrier phase shift (CP).

The GPT location may be read from the incoming geolocation positioning signal. The GPT location may include a SVN. The SNR is computed based on Eigenvalues of a received signal covariance matrix of the incoming geolocation positioning signal.

The PR is computed based on a travel time of a signal from the GPT to the GPR. The travel time is computed by cross-correlating a Gold code of the GPT and a replica of the Gold code generated at the GPR. The DO is computed based on an amplitude and a phase of the incoming geolocation positioning signal and an amplitude and a phase of a reference signal. The CP is computed based on a phase difference between the incoming geolocation positioning signal and a reference signal.

At operation 930, the computing machine provides, using a geolocation positioning spoofing/meaconing detection subsystem 620, the geolocation positioning signal characteristics as an input vector to a neural network. The neural network determines whether the incoming geolocation positioning signal 601 is a legitimate geolocation positioning signal or a fake geolocation positioning signal. The neural network includes at least an input layer, one or more hidden layers, and an output layer.

In some cases, the neural network includes multiple neurons. Each neuron has an activation function. The activation function may be a hyperbolic tangent (tanh) function.

In some implementations, the neural network implements an online machine learning algorithm. The online machine learning algorithm uses the geolocation positioning signal characteristics (e.g., one or more of the GPT location, the SNR, the PR, the DO, and the CP) as an input vector. Online machine learning is a technique of machine learning in which data becomes available in a sequential order and is used to update our best predictor for future data at each step, as opposed to batch learning techniques which generate the best predictor by learning on the entire training data set at once. As a result of learning from new data when the new data becomes available, the online machine learning technique is able to adapt to new spoofing/meaconing attacks that might not have existed (or have been much less common) at the time the neural network was first programmed and trained.

After operation 930, in a case where the geolocation positioning signal 601 is legitimate, the method 900 continues to operation 960. In a case where the geolocation positioning signal 601 is fake, the method 900 continues to operation 940.

At operation 940, upon determining that the geolocation positioning signal 601 is fake, the computing machine computes, using a Bayesian inference subsystem 630, a likelihood and a severity of a geolocation positioning technology based attack. The fake signal may be due either to an attack or an incorrect signal being detected due to something other than an attack. In some cases, the Bayesian inference subsystem computes the likelihood and the severity of the geolocation positioning technology based attack based on a prior probability distribution of geolocation positioning technology based attacks and an attack presence probability. The prior probability distribution and the attack presence probability are updated based on processing of signals received via a geolocation positioning receiver.

At operation 950, the computing machine outputs the computed likelihood and severity.

At operation 960, the computing machine outputs an indication of whether the incoming geolocation positioning signal is the legitimate geolocation positioning signal or the fake geolocation positioning signal. The outputs of operations 950 and 960 may be provided as a digital transmission to a display device of the computing machine or via a network to another computing device.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A geolocation spoofing/meaconing detection apparatus, the apparatus comprising:
processing circuitry and memory; the processing circuitry to:
access an incoming geolocation positioning signal;
determine, using a signal characteristics calculation subsystem, geolocation positioning signal characteristics for the incoming geolocation positioning signal;
provide, using a geolocation positioning spoofing/meaconing detection subsystem, the geolocation positioning signal characteristics as an input vector to a neural network, wherein the neural network determines whether the incoming geolocation positioning signal is a legitimate geolocation positioning signal or a fake geolocation positioning signal, wherein the neural network comprises at least an input layer, one or more hidden layers, and an output layer;
in a case where the incoming geolocation positioning signal is determined to be the fake geolocation positioning signal: compute, using a Bayesian inference subsystem, a likelihood and a severity of a geolocation positioning technology based attack; and
provide, as a digital transmission, an indication of whether the incoming geolocation positioning signal is the legitimate geolocation positioning signal or the fake geolocation positioning signal and, in the case where the incoming geolocation positioning signal is determined to be the fake geolocation positioning signal, the likelihood and the severity of the geolocation positioning technology based attack.

2. The apparatus of claim 1, wherein the geolocation positioning signal characteristics comprise one or more of: a geolocation positioning transmitter (GPT) location, a signal-to-noise ratio (SNR), a pseudo-range (PR), a Doppler shift (DO), and a carrier phase shift (CP).

3. The apparatus of claim 2, wherein the GPT location is read from the incoming geolocation positioning signal.

4. The apparatus of claim 3, wherein the GPT location comprises a satellite vehicle number (SVN).

5. The apparatus of claim 2, wherein the SNR is computed based on Eigenvalues of a received signal covariance matrix of the incoming geolocation positioning signal.

6. The apparatus of claim 2, wherein the PR is computed based on a travel time of a signal from the GPT to a geolocation positioning receiver (GPR), wherein the travel time is computed by cross-correlating a Gold code of the GPT and a replica of the Gold code generated at the GPR.

7. The apparatus of claim 2, wherein the DO is computed based on an amplitude and a phase of the incoming geolocation positioning signal and an amplitude and a phase of a reference signal.

8. The apparatus of claim 2, wherein the CP is computed based on a phase difference between the incoming geolocation positioning signal and a reference signal.

9. The apparatus of claim 1, wherein the neural network comprises a plurality of neurons, wherein each neuron has an activation function.

10. The apparatus of claim 9, wherein the activation function is a hyperbolic tangent (tanh) function.

11. The apparatus of claim 1, wherein the neural network implements an online machine learning algorithm, wherein the online machine learning algorithm uses the geolocation positioning signal characteristics as the input vector.

12. The apparatus of claim 1, wherein the Bayesian inference subsystem computes the likelihood and the severity of the geolocation positioning technology based attack based on a prior probability distribution of geolocation positioning technology based attacks and an attack presence probability, and wherein the prior probability distribution and the attack presence probability are updated based on processing of signals received via a geolocation positioning receiver.

13. The apparatus of claim 1, further comprising a geolocation positioning receiver to:
receive the incoming geolocation positioning signal; and
provide the incoming geolocation positioning signal for access by the processing circuitry.

14. The apparatus of claim 11, wherein the geolocation positioning receiver comprises a global positioning system (GPS) receiver.

15. A non-transitory machine-readable medium for geolocation spoofing/meaconing detection, the machine-readable medium storing instructions which, when executed by processing circuitry of one or more machines, cause the processing circuitry to:
access an incoming geolocation positioning signal;
determine, using a signal characteristics calculation subsystem, geolocation positioning signal characteristics for the incoming geolocation positioning signal;
provide, using a geolocation positioning spoofing/meaconing detection subsystem, the geolocation positioning signal characteristics as an input vector to a neural network, wherein the neural network determines whether the incoming geolocation positioning signal is a legitimate geolocation positioning signal or a fake geolocation positioning signal, wherein the neural network comprises at least an input layer, one or more hidden layers, and an output layer;
in a case where the incoming geolocation positioning signal is determined to be the fake geolocation positioning signal: compute, using a Bayesian inference subsystem, a likelihood and a severity of a geolocation positioning technology based attack; and
provide, as a digital transmission, an indication of whether the incoming geolocation positioning signal is the legitimate geolocation positioning signal or the fake geolocation positioning signal and, in the case where the incoming geolocation positioning signal is determined to be the fake geolocation positioning signal, the likelihood and the severity of the geolocation positioning technology based attack.

16. The machine-readable medium of claim 15, wherein the geolocation positioning signal characteristics comprise one or more of: a geolocation positioning transmitter (GPT) location, a signal-to-noise ratio (SNR), a pseudo-range (PR), a Doppler shift (DO), and a carrier phase shift (CP).

17. The machine-readable medium of claim 15, wherein the neural network implements an online machine learning algorithm, wherein the online machine learning algorithm uses the geolocation positioning signal characteristics as the input vector.

18. A geolocation spoofing/meaconing detection method comprising:
accessing an incoming geolocation positioning signal;
determining, using a signal characteristics calculation subsystem, geolocation positioning signal characteristics for the incoming geolocation positioning signal;
providing, using a geolocation positioning spoofing/meaconing detection subsystem, the geolocation positioning signal characteristics as an input vector to a neural network, wherein the neural network determines whether the incoming geolocation positioning signal is a legitimate geolocation positioning signal or a fake geolocation positioning signal, wherein the neural network comprises at least an input layer, one or more hidden layers, and an output layer;

in a case where the incoming geolocation positioning signal is determined to be the fake geolocation positioning signal: computing, using a Bayesian inference subsystem, a likelihood and a severity of a geolocation positioning technology based attack; and providing, as a digital transmission, an indication of whether the incoming geolocation positioning signal is the legitimate geolocation positioning signal or the fake geolocation positioning signal and, in the case where the incoming geolocation positioning signal is determined to be the fake geolocation positioning signal, the likelihood and the severity of the geolocation positioning technology based attack.

19. The method of claim 18, wherein the geolocation positioning signal characteristics comprise one or more of: a geolocation positioning transmitter (GPT) location, a signal-to-noise ratio (SNR), a pseudo-range (PR), a Doppler shift (DO), and a carrier phase shift (CP).

20. The method of claim 18, wherein the neural network implements an online machine learning algorithm, wherein the online machine learning algorithm uses the geolocation positioning signal characteristics as the input vector.

* * * * *